(12) United States Patent
Endo et al.

(10) Patent No.: US 7,111,703 B2
(45) Date of Patent: Sep. 26, 2006

(54) VEHICULAR PEDAL SUPPORTING STRUCTURE

(75) Inventors: Yoshihide Endo, Okazaki (JP); Akiyoshi Watanabe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 455 days.

(21) Appl. No.: 10/452,118

(22) Filed: Jun. 3, 2003

(65) Prior Publication Data

US 2004/0003674 A1    Jan. 8, 2004

(30) Foreign Application Priority Data

Jun. 13, 2002 (JP) .............................. 2002-172558

(51) Int. Cl.
*B60K 28/10* (2006.01)
(52) U.S. Cl. .................... 180/274; 280/748; 74/512
(58) Field of Classification Search ............. 280/748, 280/784, 779; 180/274, 275, 271; 74/512
See application file for complete search history.

(56) References Cited

U.S. PATENT DOCUMENTS

| | | | |
|---|---|---|---|
| 5,983,746 A | 11/1999 | Nawata et al. | |
| 5,996,440 A | 12/1999 | Nawata et al. | |
| 6,041,674 A | 3/2000 | Kato | |
| 6,076,422 A * | 6/2000 | Tabata | 74/512 |
| 6,327,930 B1 * | 12/2001 | Ono et al. | 74/512 |
| 6,339,971 B1 | 1/2002 | Kato | |
| 6,481,311 B1 * | 11/2002 | Sanagi et al. | 74/512 |
| 6,701,800 B1 * | 3/2004 | Saitou et al. | 74/512 |
| 2003/0056616 A1 * | 3/2003 | Matsumoto et al. | 74/512 |
| 2003/0106392 A1 * | 6/2003 | Willemsen | 74/512 |

FOREIGN PATENT DOCUMENTS

| | | |
|---|---|---|
| EP | 0 810 124 A2 | 12/1997 |
| JP | A 9-254821 | 9/1997 |
| JP | A 9-316581 | 12/1997 |
| JP | A 10-236288 | 9/1998 |
| JP | A 10-310036 | 11/1998 |
| JP | 11268667 | 10/1999 |
| JP | 2002067899 | 3/2002 |
| JP | 2003112614 | 4/2003 |

* cited by examiner

*Primary Examiner*—Paul N. Dickson
*Assistant Examiner*—Tiffany L. Webb
(74) *Attorney, Agent, or Firm*—Oliff & Berridge, PLC

(57) ABSTRACT

A vehicular pedal supporting structure includes a pedal bracket, a pedal, and a guide. A front portion of the pedal bracket is fixed to a first vehicle-body-side constituent member, while a rear portion of the pedal bracket is extended toward a rear of the vehicle. The pedal is supported on lateral side portions of the pedal bracket so as to be swingable around a center shaft. The guide causes the rear portion of the pedal bracket to be displaced backwards and downwards when the pedal bracket is displaced backwards as a result of application of a frontal external force to create a rotational displacement of the rear portion of the pedal bracket relative to the front portion. The pedal bracket is provided with a rupture creation mechanism for ensuring that the rear portion of the pedal bracket is at least partially ruptured from the front portion thereof when the rear portion is rotationally displaced.

12 Claims, 13 Drawing Sheets

F I G. 11
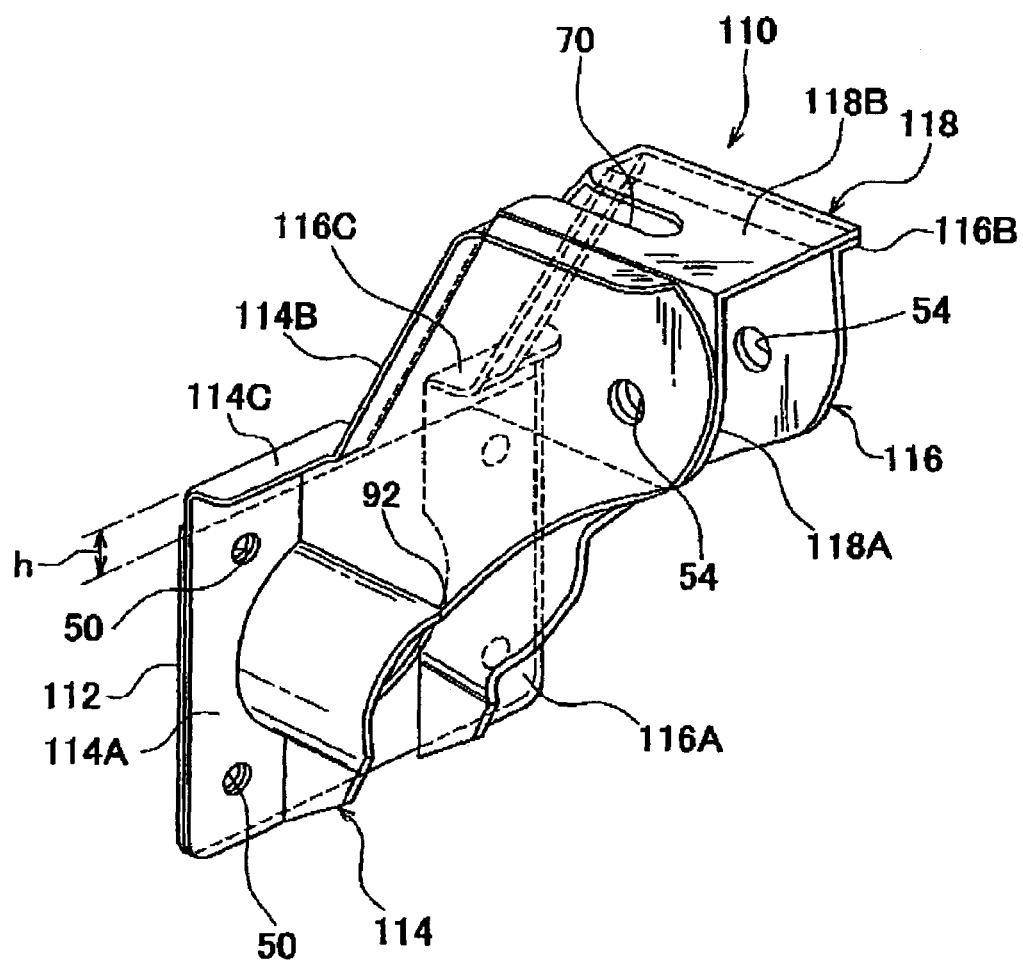

US 7,111,703 B2

VEHICULAR PEDAL SUPPORTING STRUCTURE

INCORPORATION BY REFERENCE

The disclosure of Japanese Patent Application No. 2002-172558 filed on Jun. 13, 2002, including the specification, drawings, and abstract is incorporated herein by reference in its entirety.

BACKGROUND OF THE INVENTION

1. Field of the Invention

The invention relates to a vehicular pedal supporting structure capable of displacing a trodden face of a pedal substantially forwards with respect to a vehicle when a pedal bracket is displaced backwards with respect to the vehicle together with a vehicle-body-side constituent member as a result of application of a predetermined external force from the front side of the vehicle.

2. Description of the Related Art

Heretofore, various arts for controlling displacement of a vehicular pedal such as a brake pedal or the like in the case of application of a predetermined external force from the front side of a vehicle have been developed for the purpose of improving the performance of protecting passengers. One of such arts is proposed by the present applicant and is disclosed in Japanese Patent Application No. 10-236288. This art will be outlined below.

As shown in FIG. 12, a brake pedal 150 of suspension type is swingably supported by a pedal bracket 152. The pedal bracket 152 has a generally U-shaped longitudinal cross section with an open bottom. A base plate 154 generally in the shape of a rectangular flat plate is welded to a front end portion of the pedal bracket 152, and constitutes part of the pedal bracket 152. The base plate 154 is fixed to a dash panel 156 inside a cabin, whereby the front portion of the pedal bracket 152 is mounted to the dash panel 156.

On the other hand, an instrument panel reinforce 158 as a high-strength member is disposed substantially behind the dash panel 156 with respect to a vehicle, with the longitudinal direction of the instrument panel reinforce 158 being substantially coincident with the lateral direction of the vehicle. A slide guide 160 is disposed protruding substantially forwards with respect to the vehicle, and a guide face (inclined face) 160A is provided on a lower face of the slide guide 160. A base end portion of the slide guide 160 is fixed to the instrument panel reinforce 158 at a predetermined position in the longitudinal direction. An angle-like coupling bracket 162 is fixed to a tip end portion of the slide guide 160. Correspondingly, a slide guide bracket 164 having a generally U-shaped cross section is stuck to an upper rear-end portion of the pedal bracket 152. A top wall portion of the slide guide bracket 164 and a bottom wall portion of the coupling bracket 162 are connected by a rivet 166.

According to the aforementioned arrangement, if the dash panel 156 is displaced substantially backwards with respect to the vehicle when a predetermined external force is applied from the front side of the vehicle, the rivet 166 connecting the slide guide bracket 164 and the coupling bracket 162 together is sheared. Thus, the slide guide bracket 164 and the coupling bracket 162 are disconnected from each other. As a result, the slide guide bracket 164 comes into abutment on the guide face 160A of the slide guide 160, and then slides along the guide face 160A substantially downwards with respect to the vehicle. During this sliding movement of the slide guide bracket 164, the pedal bracket 152 is plastically deformed and rotationally displaced around the front end side thereof substantially downwards with respect to the vehicle. As a result, a pedal pad 168 of the brake pedal 150 is displaced substantially forwards with respect to the vehicle.

If a rotational displacement structure based on a slide mechanism as described above is adopted herein, a load input to the dash panel 156 is input to the slide guide 160 and hence to the side of the instrument panel reinforce 158 via the pedal bracket 152. In general, it is preferred that the load thus input to the side of the instrument panel reinforce 158 be low.

Further, a vehicular pedal supporting structure of this sort often tends to be mechanically complicated. Basically, however, if this vehicular pedal supporting structure adopts a simple mechanism with a reduced number of parts, it is easier to guarantee operational reliability, and a reduction in cost is achieved as well. It can be concluded, therefore, that structural simplification is also an important theme to be pursued.

SUMMARY OF THE INVENTION

The invention has been made in consideration of the understanding acquired from the above description. It is an object of the invention to provide a vehicular pedal supporting structure capable of displacing a trodden face of a pedal substantially forwards with respect to a vehicle when a pedal bracket is displaced backwards with respect to the vehicle together with a vehicle-body-side constituent member as a result of application of a predetermined external force from the front side of the vehicle, and also capable of reducing the load input to the side of an instrument reinforce panel.

According to an embodiment as one example of the invention, there is provided a vehicular pedal supporting structure comprising a pedal bracket, a suspension-type pedal, and a guide. A front portion of the pedal bracket is fixed to a first vehicle-body-side constituent member disposed on a front side of a vehicle, while a rear portion of the pedal bracket is extended toward a rear side of the vehicle. The suspension-type pedal is supported on both lateral portions of the pedal bracket so as to be swingable around a center shaft, and includes a trodden face to which a treading force of a passenger is applied. The guide is provided in a second vehicle-body-side constituent member disposed behind the first vehicle-body-side constituent member with respect to the vehicle, and causes the rear portion of the pedal bracket on which the pedal is supported to be rotationally displaced backwards and downwards with respect to the vehicle when the pedal bracket is displaced backwards with respect to the vehicle together with the first vehicle-body-side constituent member as a result of application of an external force from the front side of the vehicle. In this vehicular pedal supporting structure, the pedal bracket is provided with a rupture creation device for ensuring that the rear portion of the pedal bracket is at least partially ruptured from the front portion thereof when the rear portion of the pedal bracket is rotationally displaced.

When an external force is applied from the front side of the vehicle, the first vehicle-body-side constituent member may be displaced backwards with respect to the vehicle. In this case, the pedal bracket whose front end portion is fixed to the first vehicle-body-side constituent member is also displaced backwards with respect to the vehicle. At this moment, the guide provided in the second vehicle-body-side constituent member rotationally displaces the rear portion of the pedal bracket backwards and downwards with respect to the vehicle. Thus, the trodden face of the pedal supported by the pedal bracket is also rotationally displaced forwards with respect to the vehicle.

According to the vehicular pedal supporting structure arranged as described above, since the pedal bracket is provided with the rupture creation device, the rear portion of the pedal bracket is at least partially ruptured from the front portion thereof when the rear portion of the pedal bracket is rotationally displaced as described above. Therefore, the pedal bracket decreases in rigidity, and the load input to the second vehicle-body-side constituent member is reduced.

Further, if the pedal bracket is longitudinally completely ruptured due to the proceeding of a rupture, a load transmission path leading to the second vehicle-body-side constituent member is substantially shut off. In this case, therefore, the load input to the second vehicle-body-side constituent member can be further reduced.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which:

FIG. 11 is a perspective view of a pedal bracket employed in a vehicular pedal supporting structure in accordance with a third embodiment of the invention;

DETAILED DESCRIPTION OF PREFERRED EMBODIMENTS

In the following description and the accompanying drawings, the invention will be described in more detail in terms of exemplary embodiments.

[First Embodiment]

A vehicular pedal supporting structure in accordance with the first embodiment of the invention will be described with reference to FIGS. 1 to 8.

Figure 1:
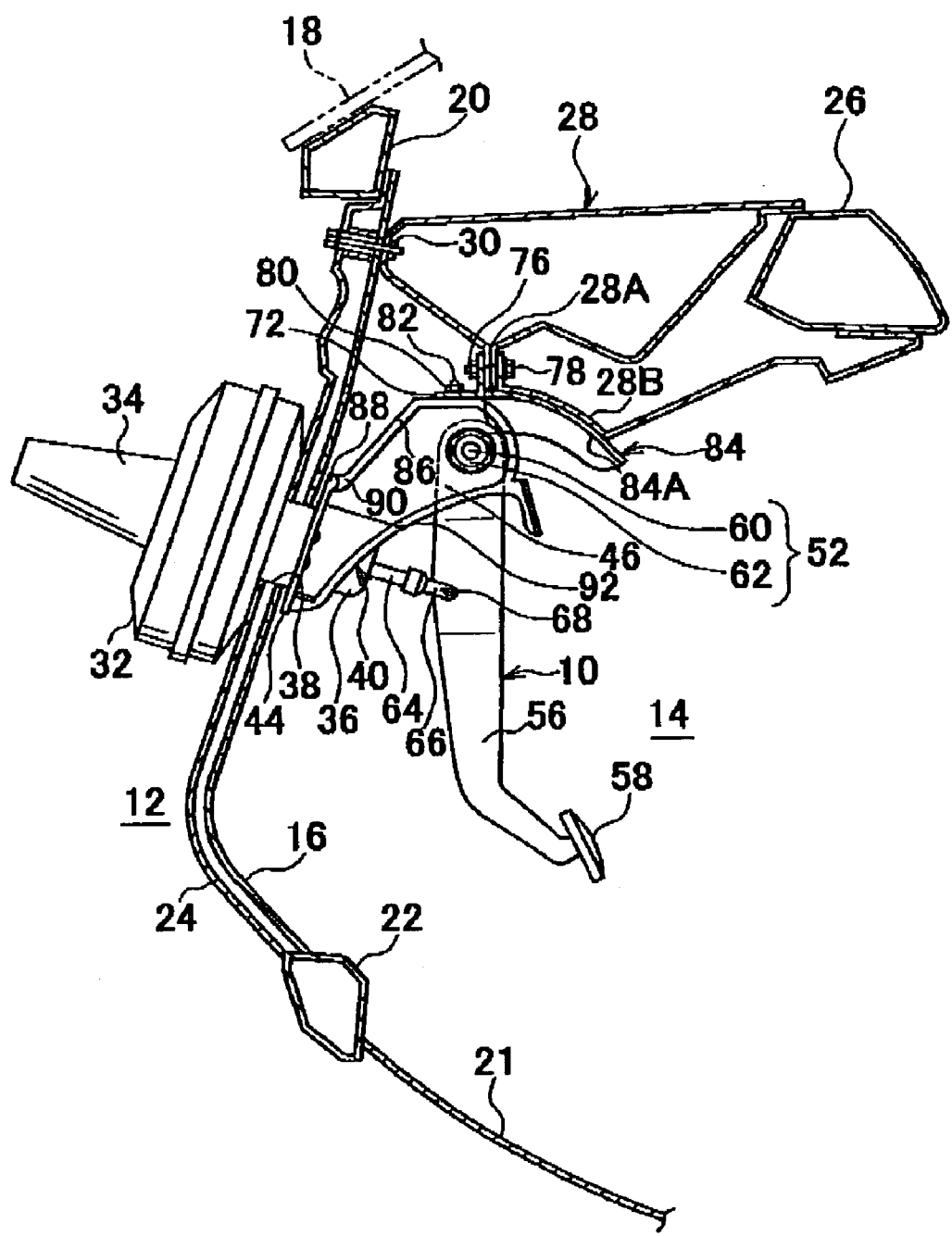
FIG. 1 is a side view of the overall arrangement of a vehicular pedal supporting structure in accordance with a first embodiment of the invention.
Figure 2:
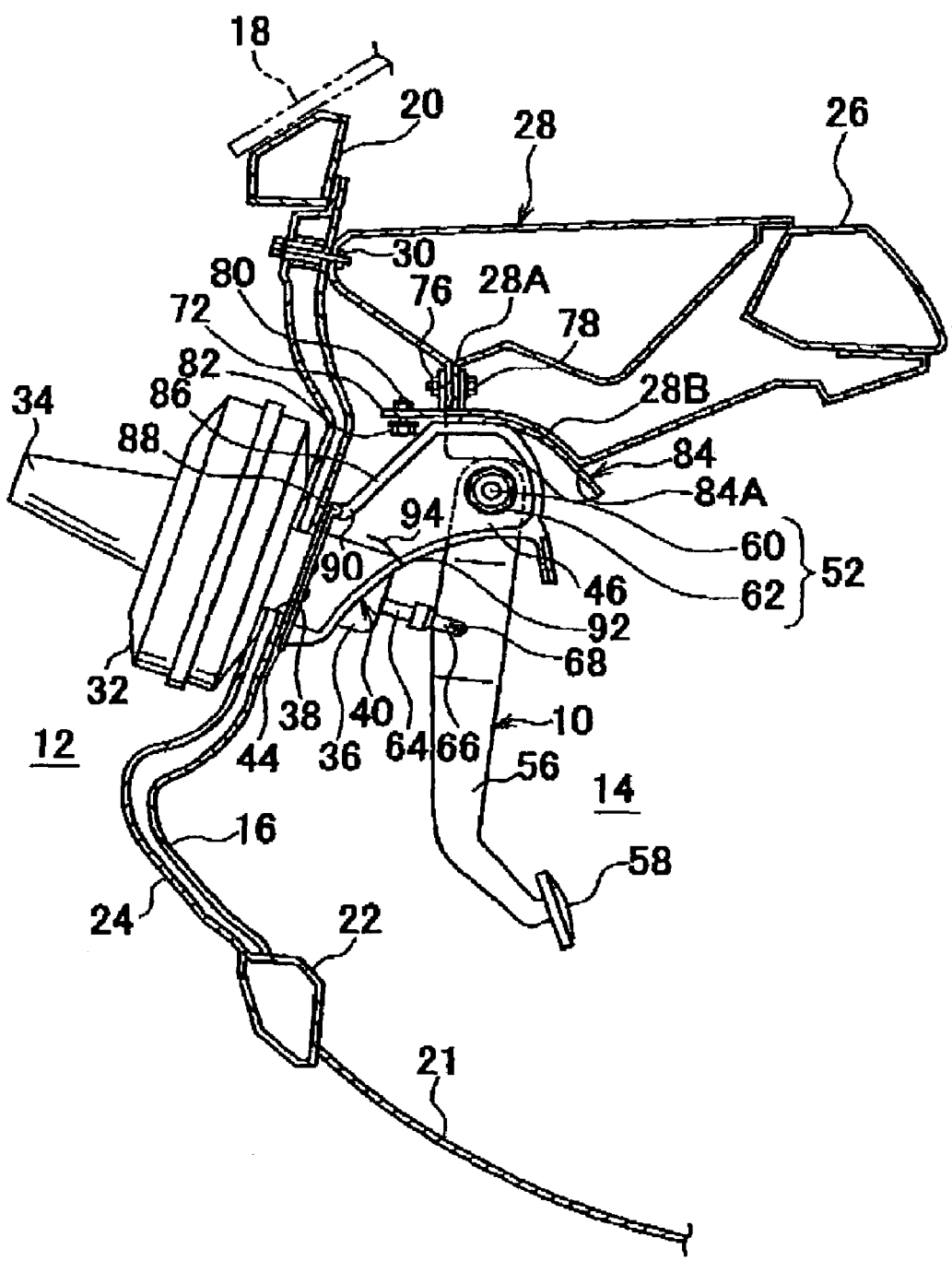
FIG. 2 is an operation-explaining view corresponding to FIG. 1 and illustrating a state that is obtained immediately after a dash panel in a state shown in FIG. 1 has started being displaced substantially backwards with respect to a vehicle.
Figure 3:
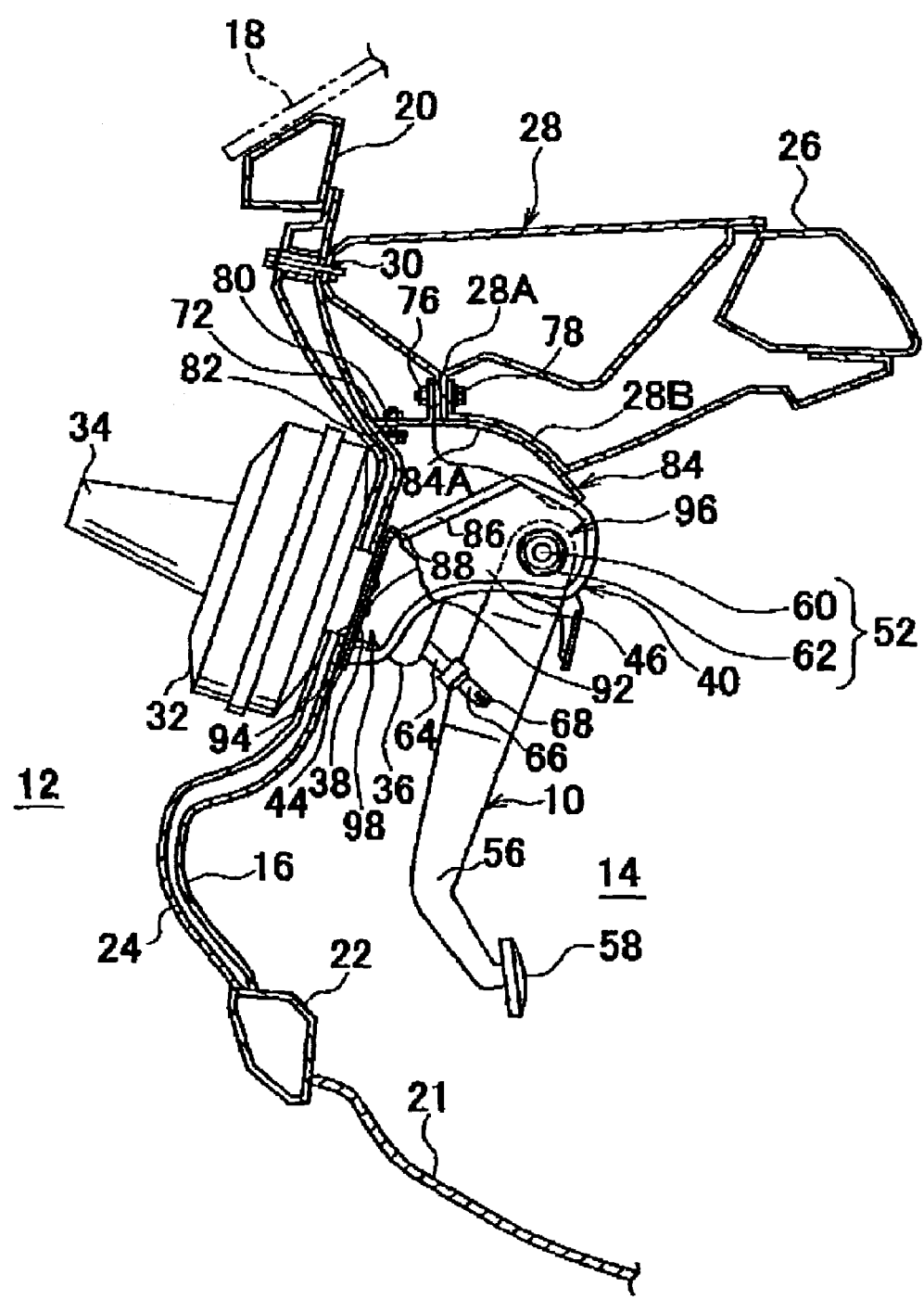
FIG. 3 is an operation-explaining view corresponding to FIG. 1 and illustrating a state in which the dash panel in a state shown in FIG. 2 has been further displaced substantially backwards with respect to the vehicle.
Figure 4:
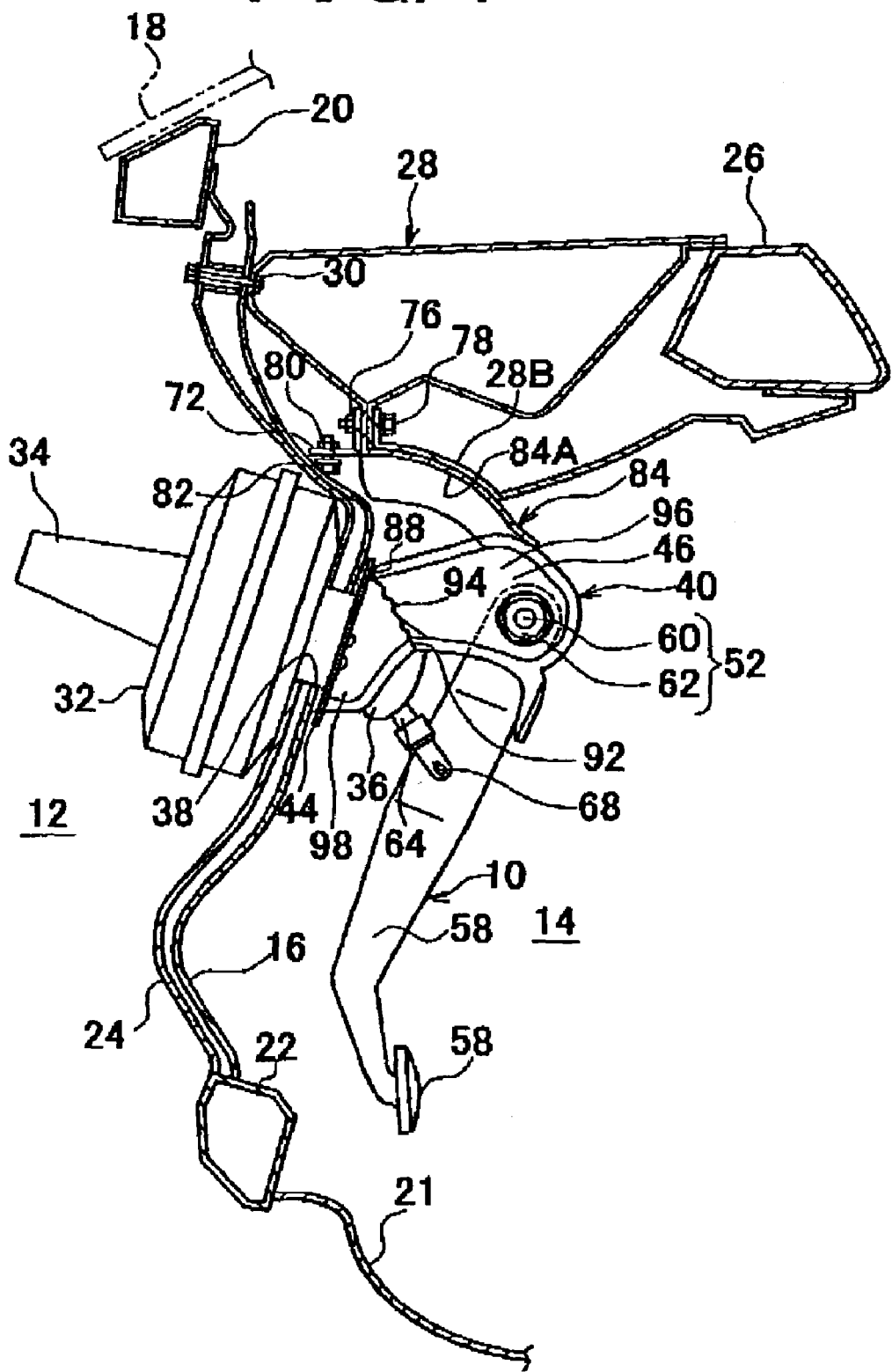
FIG. 4 is an operation-explaining view corresponding to FIG. 1 and illustrating a final state.

FIG. 1 schematically illustrates how the peripheral structure of a suspension-type brake pedal 10 in accordance with the first embodiment is mounted. FIGS. 2 to 4 illustrate how the brake pedal 10 behaves when an external force equal to or larger than a predetermined value is applied from a position in front of the vehicle. First of all, the overall arrangement of the peripheral structure of the brake pedal 10 will be described with reference to these drawings.

A dash panel 16 as a "first vehicle-body-side constituent member" is substantially vertically disposed at a position where an engine room 12 and a cabin space 14 are separated from each other. An upper end portion of the dash panel 16 is stuck to a cowl 20 by spot welding or the like. The cowl 20 is disposed in the vicinity of a lower end portion of a pane 18, and the longitudinal direction of the cowl 20 substantially coincides with the lateral direction of the vehicle. Further, a lower end portion of the dash panel 16 is stuck to a front cross member 22 by spot welding or the like. The front cross member 22 is disposed in the vicinity of a front end portion of a vehicle-body floor 21, and the longitudinal direction of the front cross member 22 substantially coincides with the lateral direction of the vehicle. Although the cowl 20 and the front cross member 22 are simply illustrated as a single-plate structure in FIGS. 1 to 4, they actually have a closed cross-sectional structure composed of two or three plates. Also, a dash insulator 24 for improving sound insulating properties is disposed over each of front and rear faces of the dash panel 16 (only the dash insulator 24 on the side of the front face is illustrated in FIGS. 1 to 4).

On the other hand, a high-strength instrument panel reinforce 26 as a "second vehicle-body-side constituent member" is disposed substantially on the rear side of the dash panel 16 with respect to the vehicle. The longitudinal direction of the instrument panel reinforce 26 substantially coincides with the lateral direction of the vehicle. A rear end side of a high-strength support bracket 28 as a "second vehicle-body-side constituent member" is stuck to the instrument panel reinforce 26 at a predetermined portion in the longitudinal direction thereof. A weld nut 30 is stuck to a rear face of a front end portion of the support bracket 28, and is fastened from the side of the dash insulator 24 by means of a bolt. This gives rise to a structure in which the support bracket 28 extending substantially longitudinally with respect to the vehicle is hung across a space between the dash panel 16 and the instrument panel reinforce 26.

A brake booster 32, a master cylinder 34 for converting hydraulic pressure, and a reservoir tank (not shown) are integrally disposed on the front side of the dash panel 16 mentioned above. The brake booster 32 functions as treading force amplification means for amplifying a treading force applied by a passenger to the brake pedal 10 as a "vehicular pedal". The master cylinder 34 converts a pressure amplified by the brake booster 32 into a hydraulic pressure. The reservoir tank stores and supplements brake fluid in response to a change in volume of a hydraulic pressure system. A boot 36 that is generally cylindrically formed is coaxially disposed in an axial center portion of the brake booster 32. In view of this, a through hole 38 for allowing penetration of the boot 36 toward the cabin space 14 is formed in the dash panel 16 at a predetermined position.

Figure 5:
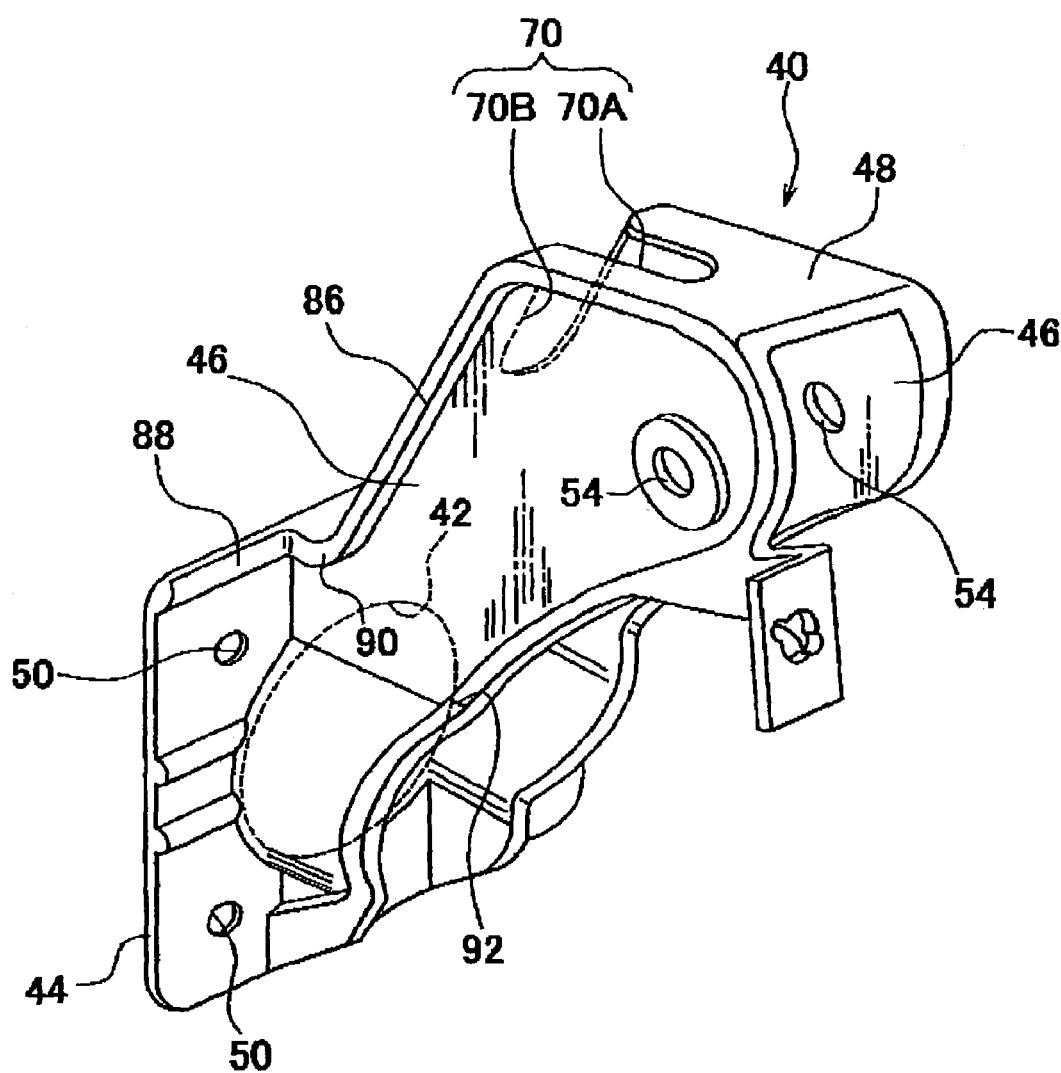
FIG. 5 is an overall perspective view of a pedal bracket in accordance with the first embodiment.
Figure 6:
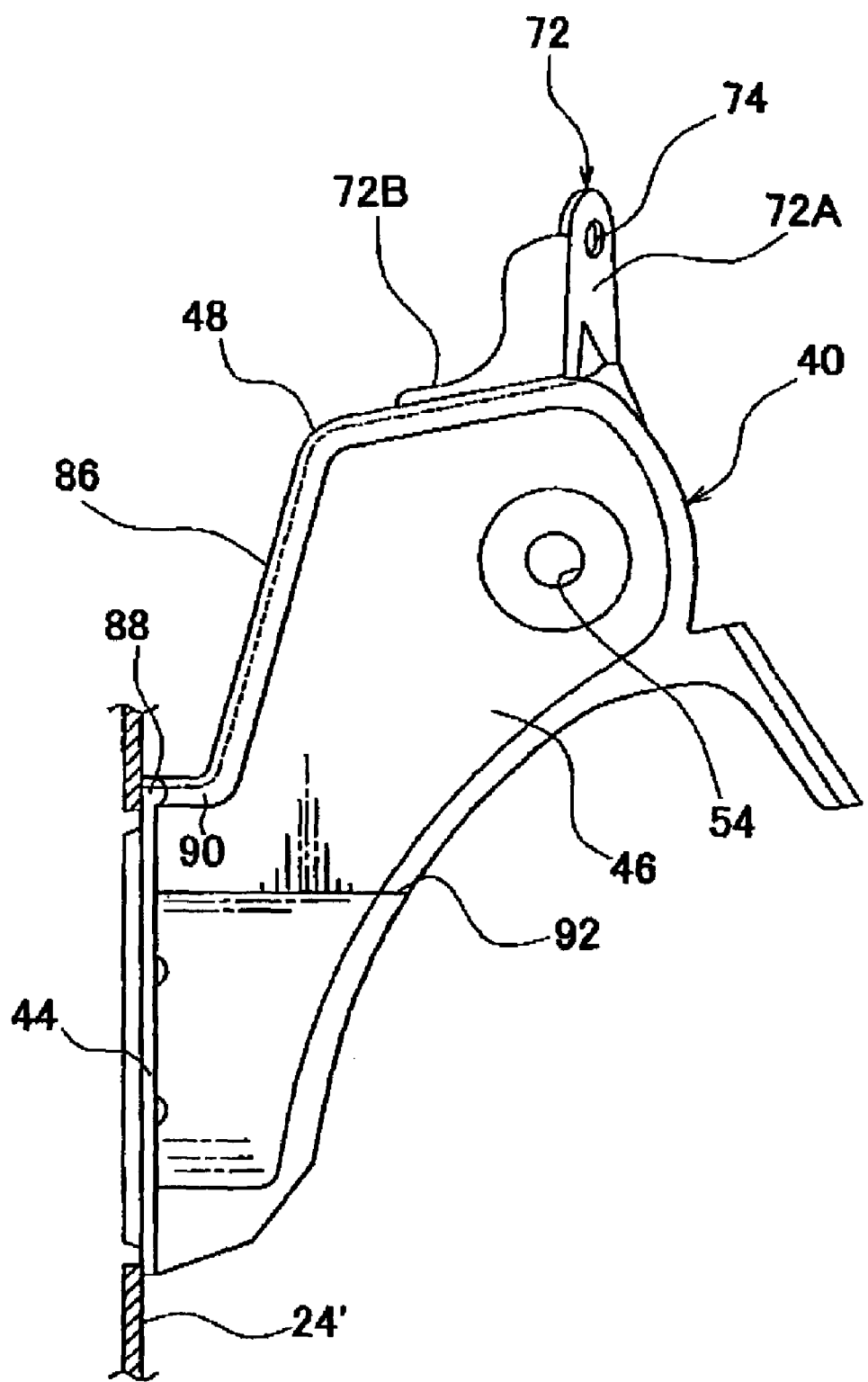
FIG. 6 is a side view of the pedal bracket shown in FIG. 5.
Figure 7:
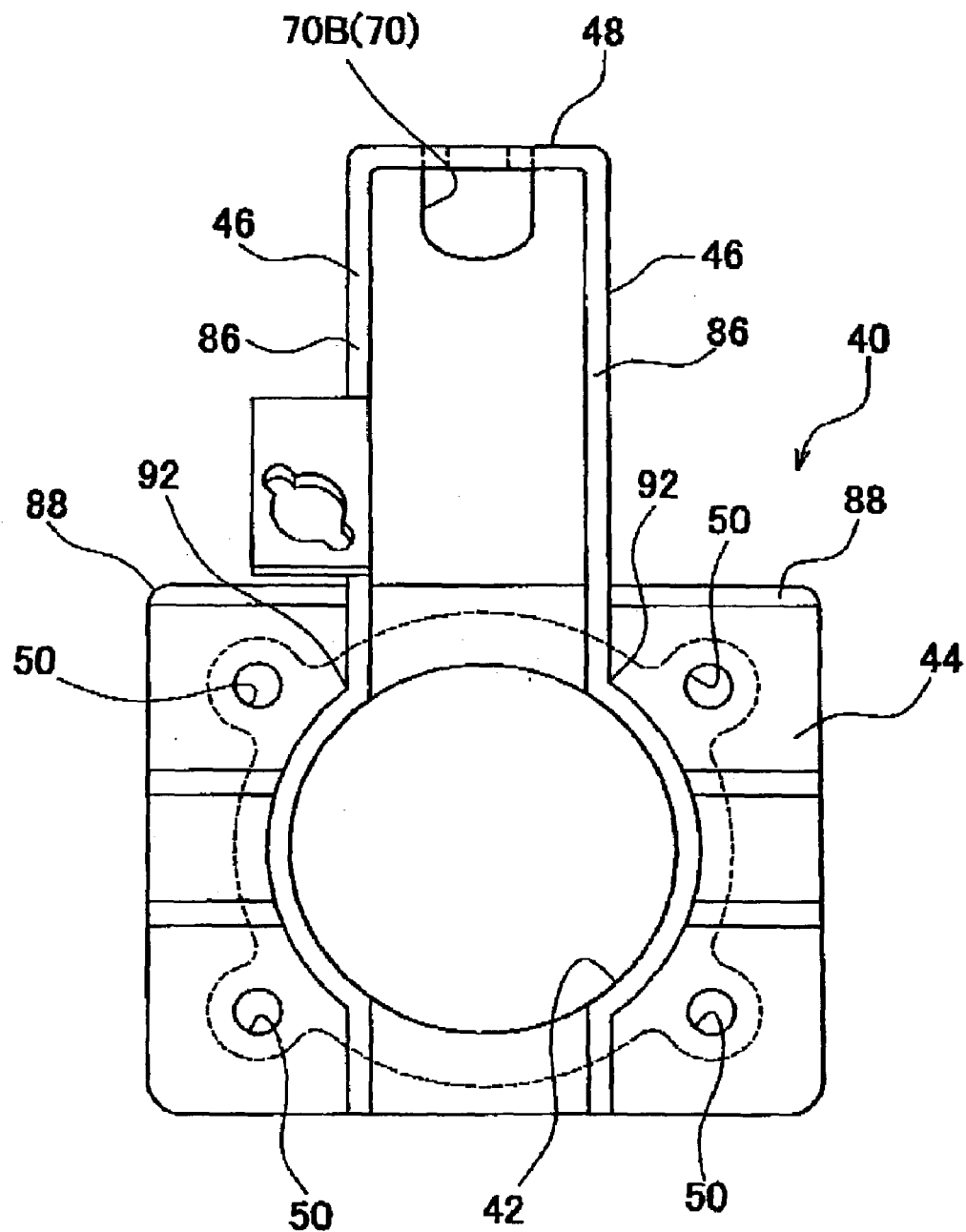
FIG. 7 is a rear view of the pedal bracket shown in FIG. 6.

On the other hand, a pedal bracket 40 that swingably supports an upper end portion of the brake pedal 10 is disposed on the rear side of the dash panel 16. As shown in FIGS. 5 to 7, the pedal bracket 40 is mainly composed of a base portion 44, a pair of side portions 46, and a top portion 48. The base portion 44 forms a plane substantially parallel to the dash panel 16. A through hole 42 for insertion of the boot 36 is formed in a central portion of the base portion 44. The side portions 46 are extended in parallel from the periphery of the through hole 42 in the base portion 44 substantially toward the rear side of the vehicle and substantially toward one upper-central side of the vehicle. A top portion 48 links upper edges of the side portions 46 together. Accordingly, the pedal bracket 40 has a U-shaped cross section as a whole, with its bottom face side being open. Bolt insertion holes 50 are formed in four corners of the base portion 44. Stud bolts (not shown) protruding from the brake booster 32 are inserted into the bolt insertion holes 50 and fastened by nuts, whereby a front end side of the pedal bracket 40 is fixed to the dash panel 16.

In addition, circular holes 54 for bearing a center shaft 52 of the brake pedal 10, which will be described next, are coaxially formed in the vicinity of rear end portions of the side portions 46 of the pedal bracket 40 mentioned above. Referring back to FIGS. 1 to 4, the brake pedal 10 is designed to include a pedal arm 56 and a pedal pad 58. The pedal arm 56 is formed by suitably bending a plate member having a narrow width. The pedal 58 is provided in a lower end portion of the pedal arm 56 and serves as a "trodden face" to which a passenger (driver) applies a treading force. Incidentally, a return spring (not shown) is engaged with an end portion of the pedal arm 56 of the brake pedal 10 or an end portion of a crevice pin 68 that will be described later. The brake pedal 10 is normally urged and pulled by the return spring in such a direction as to return to an initial position.

The center shaft 52 is disposed penetrating an upper end portion of the pedal arm 56 of the brake pedal 10. The circular holes 54 formed in the side portions 46 of the pedal bracket 26 bear the center shaft 52, whereby the pedal arm 56 of the brake pedal 10 is swingably supported around the center shaft 52. An exemplary construction of the center shaft 52 will now be described briefly. A through hole (circular hole) is formed in the upper end portion of the pedal arm 56, and a generally cylindrical pedal boss (not shown) is inserted into the through hole from a direction perpendicular to the pedal arm 56. Furthermore, after cylindrical bushes have been fitted into both end portions of the pedal boss respectively, cylindrical collars are inserted into both the bushes respectively. In this state, coaxial disposition is realized with respect to the circular holes 54 of the pedal bracket 40. A mounting bolt 60 is inserted from the outside of one of the side portions 46, and a nut 62 is screwed through a washer from the outside of the other side portion 46, whereby the center shaft 52 is constructed.

In addition, a tip end portion of a push rod (operating rod) 64 as a "treading force transmission member" protruding from an axial center portion of the boot 36 of the brake booster 32 is relatively rotatably coupled to a medium height portion of the pedal arm 56 of the brake pedal 10 mentioned above. More specifically, a crevice 66 having a U-shaped cross section is mounted to the tip end portion of the push rod 64. The pedal arm 56 is disposed while being inserted in a space between both lateral portions of the crevice 66. The crevice pin 68 penetrates both the lateral portions of the crevice 66 and the pedal arm 56, and a β pin, a snap ring, or the like is fitted to penetration-end portions of the crevice pin 68 so that the crevice pin 68 is prevented from falling out, whereby the push rod 64 and the pedal arm 56 are relatively rotatably coupled to each other.

Further, as shown in FIG. 5, a slit 70 extending substantially in the longitudinal direction of the vehicle is formed in a region ranging from an upper end portion to an inclined portion of the top portion 48 of the pedal bracket 40 mentioned above. The slit 70 is composed of an upper slit 70A and a lower slit 70B. The width of the upper slit 70A is so set as to allow insertion of a shaft of a mounting bolt 82, which will be described next. The width of the lower slit 70B is so set as to allow insertion of a head portion of the mounting bolt 82.

As shown in FIGS. 1 to 4, utilizing the slit 70, the rear end side of the pedal bracket 40 mentioned above is removably coupled to the support bracket 28 via a coupling bracket 72, and the support bracket 28 is hung across the space between the instrument panel reinforce 26 and the dash panel 16. More specifically, as shown in FIG. 6, the coupling bracket 72 is formed in an angle-like shape in a side view, and is designed to include a vertical portion 72A and a horizontal portion 72B. The coupling bracket 72 is made of an aluminum alloy and is a part different from the pedal bracket 40. A bolt insertion hole 74 is formed in an upper end portion of the vertical portion 72A of the coupling bracket 72, and a weld nut 76 (see FIG. 1 and the like) is coaxially welded in advance to a front face stretching around the bolt insertion hole 74. The vertical portion 72A is brought into abutment on a longitudinal wall portion 28A formed in a lower-end front portion of the support bracket 28, and a mounting bolt 78 is screwed into the weld nut 76 from the rear side, whereby the vertical portion 72A of the coupling bracket 72 is fixed to the longitudinal wall portion 20A of the support bracket 28.

On the other hand, a bolt insertion hole (not shown) is formed in the horizontal portion 72B of the coupling bracket 72 as well, and a weld nut 80 is coaxially welded in advance to an upper face stretching around the bolt insertion hole. The horizontal portion 72B is laid on an upper end portion of the top portion 48 of the pedal bracket 40 (such that a bolt insertion hole (not shown) is superimposed on the slit 70), and the mounting bolt 82 is screwed into the weld nut 80 through a slit 76 from below the top portion 48, whereby the rear end side of the pedal bracket 40 is mounted to the horizontal portion 72B of the coupling bracket 72 such that the pedal bracket 40 can be removed when a predetermined external force is applied from the front side of the vehicle.

Further, a slide guide 84 as a "guide" set at a predetermined high strength is disposed on the rear side of the coupling bracket 72 mentioned above, namely, on the rear side of the rear end side of the pedal bracket 40. The slide guide 84 has a generally U-shaped longitudinal cross section, while being open substantially on the lower side with respect to the vehicle. In addition, a lower face of a bottom wall portion constituting a guide face 84A has a curved face that is curved more smoothly toward the substantially lower side of the vehicle as the distance from the substantially rear side of the vehicle is reduced. The slide guide 84 constructed as described above is stuck to a mounting portion 28B formed in a lower end portion of the aforementioned support bracket 28 and having a curved face, by means of spot welding or the like.

Next, the construction of the pedal bracket 40 as an essential part of the vehicular pedal supporting structure in accordance with the first embodiment will be described in detail.

As shown in FIGS. 5 to 7, the pedal bracket 40 in accordance with the first embodiment is constructed as a die-cast piece made of aluminum. Each of band-shaped peripheral ribs 86 as "first thick-wall portions" is integrally formed along the entire circumference of an outer periphery portion of a corresponding one of the side portions 46 of the pedal bracket 40. Because these peripheral ribs 86 are formed, the pedal bracket 40 is thicker in regions having the peripheral ribs 86 than in the other regions. This contributes toward increasing the strength and rigidity of the pedal bracket 40 and retaining the shape of the pedal bracket 40 during rotational displacement thereof.

Moreover, a pair of rectilinear axial ribs 88 as "second thick-wall portions" are integrally formed in a cabin-side upper edge portion of the base portion 44 of the pedal bracket 40. It is to be noted herein that the axial ribs 88 are formed not in an upper edge portion located between the side portions 46 but only in such a direction as to protrude from the side portions 46 (see FIG. 7). The axial ribs 88 constitute a rotational center shaft for rotational displacement of the rear end side of the pedal bracket 40.

An upper front-end portion of each of the peripheral ribs 86 and an inner end portion of a corresponding one of the axial ribs 88 are connected to each other, while being offset toward the lower edge side of a corresponding one of the side portions 46 of the pedal bracket 40. More specifically, the upper front-end portion of each of the peripheral ribs 86 and the inner end portion of a corresponding one of the axial ribs 88 are smoothly linked with each other such that a portion bended in the shape of "L" is formed in a side view of the pedal bracket 40 (this portion will be referred to as a "bending portion 90" hereinafter).

Further, the lower edge side of each of the side portions 46 of the pedal bracket 40 mentioned above has a certain shape on the front side and another on the rear side. More concretely, the front portion on the lower edge side of each of the side portions 46 is cylindrically swells so as to avoid interfering with the boot 36 of the brake booster 32 mentioned above. On the other hand, the rear portion on the lower edge side of each of the side portions 46 is flat and has such a width as to allow insertion of the pedal boss of the brake pedal 10. Accordingly, a stress tends to be created in a deformation portion 92 on the lower edge side of each of the peripheral ribs 86.

Next, the operation and effect of the first embodiment will be described.

The brake pedal 10 is normally mounted as shown in FIG. 1.

If a predetermined external force is applied from the front side of the vehicle in this state, a load generated at this moment is input to the dash panel 16 via the master cylinder 34 and the brake booster 32. As a result, the dash panel 16 may be displaced substantially backwards with respect to the vehicle as shown in FIG. 2. On the other hand, the coupling bracket 72 to which the rear end side of the pedal bracket 40 is connected, hence the support bracket 28 to which the coupling bracket 72 is mounted, and still the instrument panel reinforce 26 are all high-strength members and are hardly displaced substantially backwards with respect to the vehicle. Thus, both the members are displaced relative to each other, so that the rear end side of the pedal bracket 40 is pressed substantially backwards with respect to the vehicle. If this pressing load exceeds a fastening load of the mounting bolt 82 and the weld nut 80 that works between the rear end side of the pedal bracket 40 and the coupling bracket 72, the mounting bolt 82 falls out relatively from the slit 70 of the pedal bracket 40, and the rear end side of the pedal bracket 40 is removed from the coupling bracket 72.

After having been removed from the coupling bracket 72, the rear end side of the pedal bracket 40 is first displaced (makes an initial movement) substantially backwards with respect to the vehicle by a predetermined distance along the guide face 84A of the slide guide 84. Along with this movement, a counterforce acting substantially downwards with respect to the vehicle is applied to the rear end side of the pedal bracket 40 from the guide face 84A. Therefore, compressive forces are applied to the peripheral ribs 86 on the lower edge side of the pedal bracket 40. Consequently, a stress gathers on the deformation portion 92 of each of the peripheral ribs 86 and creates a crack 94.

Figure 8:
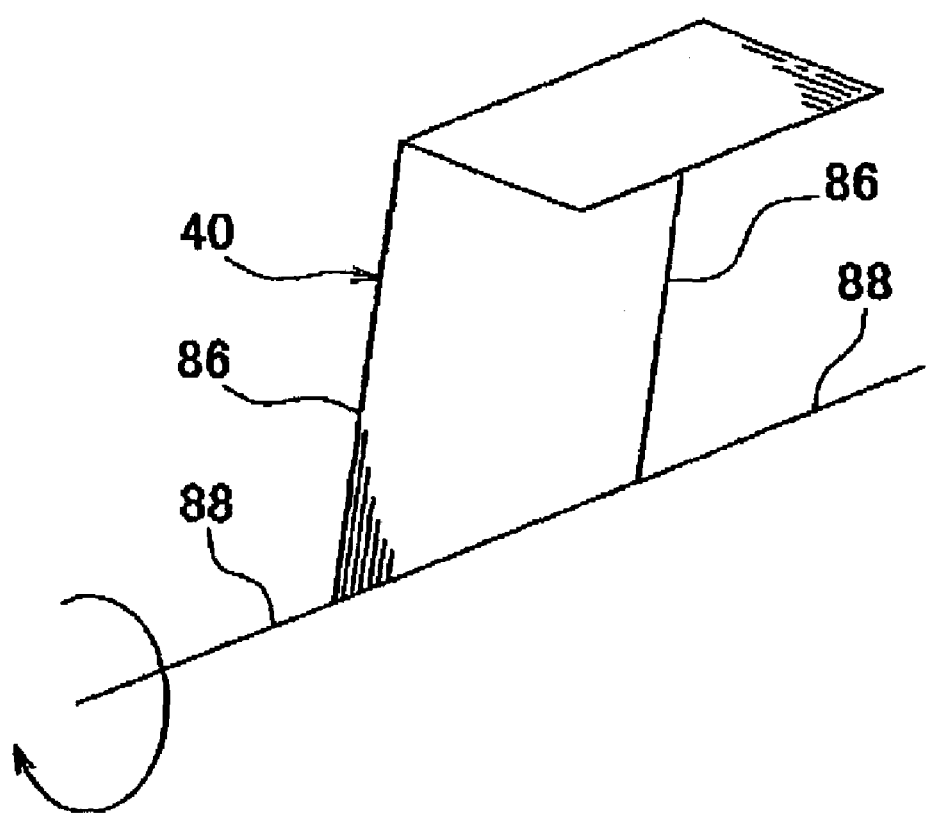
FIG. 8 is a model view illustrating as a model a manner in which the pedal bracket shown in FIG. 5 is displaced.

As shown in FIG. 3, if the dash panel 16 is further displaced substantially backwards with respect to the vehicle, the rear end side of the pedal bracket 40 is correspondingly further displaced substantially downwards with respect to the vehicle. As a whole, therefore, the pedal bracket 40 is rotationally displaced substantially backwards and downwards with respect to the vehicle. For reference, FIG. 8 illustrates as a model how the pedal bracket 40 is rotationally displaced. As shown in FIG. 8, the rear end side of the pedal bracket 40 is rotationally displaced substantially backwards and downwards with respect to the vehicle while the axial ribs 88 serve as a rotational center. Incidentally, when the pedal bracket 40 is rotationally displaced, the push rod 64 also turns around a rotational center set on the side of the brake booster 32.

In the process described above, the aforementioned crack 94 grows toward a corner portion of the L-shaped bending portion 90 and then ruptures. Because the region in which the axial ribs 88 and the peripheral ribs 86 including the bending portion 90 are formed is high in rigidity, the tip end of the rupture 94 proceeds to a fragile portion while avoiding these reinforcing portions, and finally reaches a region in the vicinity of lower edges of the axial ribs 88 in the base portion 44. If the pedal bracket 40 is thereby ruptured longitudinally, the brake pedal 10 shifts from a two-point supporting state to a one-point supporting state and becomes swingable (free) around its portion coupled to the push rod 64 (the crevice pin 68). This is because a rear pedal bracket portion 96 on which the center shaft 52 is supported is not constrained by a front pedal bracket portion 98 when the pedal bracket 40 is ruptured. Thus, the axial ribs 88 remaining on the side of the rear pedal bracket portion 96 can further be rotationally displaced by being pressed by the front pedal bracket portion 98 or the dash panel 16. Also, if the passenger (driver) presses the pedal pad 58 in a treading direction, the pedal pad 58 is extremely easily displaced substantially forwards with respect to the vehicle. If the rear end side of the pedal bracket 40 slides to a region in the vicinity of a lower end portion of the guide face 84A of the slide guide 84 as shown in FIG. 4 through the aforementioned process, rotational displacement of the rear end side of the pedal bracket 40 is terminated.

As described above, in the vehicular pedal supporting structure in accordance with the first embodiment, the crack 94 (partial rupture) is created on the lower edge side of the side portions 46 of the pedal bracket 40, and the pedal bracket 40 is finally ruptured completely. Therefore, a load transmission path extending from the dash panel 16 to the instrument panel reinforce 26 via the pedal bracket 40 is substantially shut off. Thus, when a predetermined external force is applied from the front side of the vehicle (i.e., when a predetermined high load is applied to the front portion of the vehicle), the load input to the side of the instrument panel reinforce 26 can be significantly reduced. In some cases where a certain load is input to the front portion of the vehicle or where a load is input to a certain region in the front portion of the vehicle, the pedal bracket 40 may end with the crack 94 (in a partially ruptured state) instead of being ruptured completely. In such cases as well, however, since the pedal bracket 40 decreases in rigidity, the load input to the side of the instrument panel reinforce 26 during application of the external force can be reduced, notwithstanding.

To summarize the operation and effect described hitherto, the vehicular pedal supporting structure in accordance with the first embodiment makes it possible to displace the pedal pad 58 of the brake pedal 10 substantially forwards with respect to the vehicle in the case of application of a predetermined external force from the front side of the vehicle, and besides, to significantly reduce the load input to the side of the instrument panel reinforce 26.

Further, in the vehicular pedal supporting structure in accordance with the first embodiment, since the axial ribs 88 functioning as a rotational support portion are set in the upper edge of the base portion 44 of the pedal bracket 40, the pedal pad 58 of the brake pedal 10 can be reliably displaced substantially forwards with respect to the vehicle. That is, the axial ribs 88 functioning as a rotational support portion are required so as to rotationally displace the rear portion of the pedal bracket 40 substantially backwards and downwards with respect to the vehicle, but if a rotational support portion of the rear portion of the pedal bracket 40 moves in such a direction as to relatively approach the dash panel 16 especially when the pedal bracket 40 is longitudinally completely ruptured, the distance between the center shaft 52 of the brake pedal 10 and the dash panel 16 suddenly becomes shorter after rupture than usual. In such a case, for reasons of a positional relationship with a support shaft (the crevice pin 68), it is difficult to move the brake pedal 10 forwards with respect to the vehicle. In the first embodiment, therefore, the axial ribs 88 functioning as a rotational support portion are designed such that the distance between the dash panel 16 and the center shaft 52 of the brake pedal 10 remains constant before and after rupture. As a result, the pedal pad 58 of the brake pedal 10 can be reliably displaced forwards with respect to the vehicle.

Furthermore, in the vehicular pedal supporting structure in accordance with the first embodiment, each of the axial ribs 88 is so disposed as to protrude from a corresponding one of the side portions 46 of the pedal bracket 40, and the axial ribs 88 remain in the rear pedal bracket portion 96 when the pedal bracket 40 is ruptured. Therefore, the load transmitted from the dash panel 16 can be received in a range that is wider than the space between the side portions 46 of the pedal bracket 40 substantially in the lateral direction of the vehicle. Thus, the posture of the rear pedal bracket portion 96 during rotational displacement following rupture can be stabilized. Accordingly, the rear pedal bracket portion 96 can be prevented from being rotationally displaced directionally differently from the dash panel 16.

Moreover, in the vehicular pedal supporting structure in accordance with the first embodiment, each of the band-shaped peripheral ribs 86 is set in an outer peripheral edge portion of a corresponding one of the side portions 46 of the pedal bracket 40, and the axial ribs 88 are set in the upper edge of the base portion 44. Therefore, the pedal bracket 40 can be enhanced in strength and rigidity substantially in the longitudinal direction of the vehicle and substantially in the lateral direction of the vehicle. Thus, the brake pedal 10 can also be enhanced in supporting strength and rigidity. As a result, the brake pedal 10 can be enhanced in operability during normal operation.

Furthermore, in the vehicular pedal supporting structure in accordance with the first embodiment, the upper-edge front-end portion of each of the peripheral ribs 86 mentioned above and the inner end portion of a corresponding one of the axial ribs 88 are integrally formed so as to be linked with each other via the bending portion 90. Therefore, the pedal bracket 40 can be made indiscrete in strength and rigidity. Thus, the brake pedal 10 can be further enhanced in supporting strength and rigidity substantially in the vertical direction of the vehicle and substantially in the lateral direction of the vehicle. Besides, the brake pedal 10 can be further enhanced in operability during normal operation.

Furthermore, in the vehicular pedal supporting structure in accordance with the first embodiment, when the rear end side of the pedal bracket 40 is rotationally displaced, the peripheral ribs 86 serve to retain the shape of the pedal bracket 40 and the axial ribs 88 serve as a rotational center. Therefore, the role of the peripheral ribs 86 and the role of the axial ribs 88 are distinguished from each other. Thus, as illustrated in FIG. 8 as a simplified model, the rotational displacement mode of the rear end side of the pedal bracket 40 is stabilized.

Further, in the vehicular pedal supporting structure in accordance with the first embodiment, the crack 94 starts from the deformation portion 92 of each of the side portions 46 of the pedal bracket 40, and extends toward the axial ribs 88 serving as a rotational center of the pedal bracket 40. Therefore, the direction in which the crack 94 proceeds from the deformation portion 92 can be determined more or less specifically. Thus, the rotational displacement mode of the rear end side of the pedal bracket 40 can be further stabilized.

Especially in the case of the first embodiment, each of the peripheral ribs 86 is connected to a corresponding one of the axial ribs 88 via the bending portion 90 that is generally in the shape of "L" in a side view. Therefore, the crack 94 starts from the deformation portion 92 of each of the side portions 46 of the pedal bracket 40, and proceeds toward the corner portion of the bending portion 90. That is, a region corresponding to the axial ribs 88 as a target direction in which the crack 94 is to proceed is set at a position closer to the crack 94, and the end of the crack 94 is determined specifically. Thus, the direction in which the crack 94 proceeds can be inhibited from becoming inconstant. Accordingly, after the crack 94 has been created, the pedal bracket 40 can be reliably ruptured below the bending portion 90 and the axial ribs 88.

Besides, in the vehicular pedal supporting structure in accordance with the first embodiment, the lower edge side of each of the side portions 46 of the pedal bracket 40 has a certain shape on the front side and another shape on the rear side, when viewed in the lateral direction of the pedal bracket 40. Therefore, if a load is input to the pedal bracket 40 from the dash panel 16, a stress gathers on the deformation portion 92. Accordingly, the starting point of the crack 94 can be set arbitrarily and specifically.

Further, in the vehicular pedal supporting structure in accordance with the first embodiment, rupture of the pedal bracket 40 makes it possible to displace the pedal pad 58 of the brake pedal 10 around a coupling point (the crevice pin 68) coupled to the push rod 64 and substantially forwards with respect to the vehicle. Thus, the length of the guide face 84A (guide length) of the slide guide 84 can be reduced. That is, if an attempt is made to rotationally displace the rear portion of the pedal bracket 40 substantially backwards and downwards with respect to the vehicle while adopting a construction that does not allow rupture of the pedal bracket 40, the guide length of the slide guide needs to be lengthened to a certain extent, but if the pedal bracket 40 is made to be ruptured during rotational displacement thereof as in the first embodiment, the rear portion of the pedal bracket 40 can be rotationally displaced backwards and downwards with respect to the vehicle with ease. Therefore, the guide length of the slide guide can be reduced correspondingly. Accordingly, the degree of freedom in designing can be enhanced.

Furthermore, in the vehicular pedal supporting structure in accordance with the first embodiment of the invention, the pedal bracket 40 is constructed as an integrally cast piece. Therefore, the number of parts and the man-hour required for machining and mounting are reduced in comparison with a case where a plurality of press-molded pieces are assembled by welding or the like so as to constitute a pedal bracket. Also, if the pedal bracket 40 is manufactured as an integrally cast piece, the peripheral ribs 86 and the axial ribs 88 can be integrally formed simultaneously with the manufacture of the pedal bracket 40. Additionally, variations of the shape of the pedal bracket 40 can be made simultaneously with the casting thereof, and there is no need to perform machining afterwards so as to cut notches or the like. Thus, the vehicular pedal supporting structure can be structurally simplified, which helps to achieve a reduction in cost.

Further, in the vehicular pedal supporting structure in accordance with the first embodiment, the pedal bracket 40 is made of aluminum. Therefore, if a pedal bracket is made of aluminum with a load-deformation characteristic substantially identical to that of a plastically deformable iron-type pedal bracket of the related art, the thickness of the pedal bracket made of aluminum can be increased. As a result, the pedal bracket 40 of the first embodiment can be made about three times as rigid as the pedal bracket of the related art, and the brake pedal 10 can be enhanced, in operability during normal operation. Besides, since an aluminum material is unlikely to stretch and likely to break when a stress gathers thereon, the invention can be favorably applied thereto. These considerations reveal that the first embodiment can ensure both that the brake pedal 10 exhibits high rigidity and that the brake pedal 10 is rotationally displaced substantially backwards and downwards with respect to the vehicle by being ruptured when a predetermined external force is applied thereto from the front side of the vehicle.

Furthermore, if generation of a crack is allowed at a predetermined position on the lower edge side of each of the side portions 46 of the pedal bracket 40 and the crack 94 is urged to proceed toward the axial ribs 88 as in the first embodiment, the rear end side of the pedal bracket 40 can be reliably displaced through rotation substantially backwards and downwards with respect to the vehicle and the pedal bracket 40 can be ruptured, even in the case where the brake booster 32 enters the cabin by rotating counterclockwise in a side view as opposed to the case of the aforementioned description.

Still further, the vehicular pedal supporting structure in accordance with the first embodiment brings about effects that will be mentioned below.

In the case of the first embodiment, as shown in FIGS. 3 and 4, when the pedal bracket 40 is ruptured, a front end portion of the rear pedal bracket portion 96 covers a rear end portion of the front pedal bracket portion 98. Therefore, when the pedal bracket 40 is ruptured and contacts the dash panel 16, the axial ribs 88 of the rear pedal bracket portion 96 are basically the only regions that are ruptured and contact the dash panel 16. Because the axial ribs 88 are increased in thickness, they are far from aculeate. Accordingly, even if a ruptured plane of the pedal bracket 40 hits the dash panel 16, the dash panel 16 is not damaged.

Further, in the case of the first embodiment, since each of the peripheral ribs 86 is connected to a corresponding one of the axial ribs 88 via the bending portion 90, molten metal smoothly flows during die casting or sand molding. Therefore, the occurrence of molding failures is unlikely, and the productivity of the pedal bracket 40 can be enhanced.

Furthermore, in the case of the first embodiment, since each of the peripheral ribs 86 is connected to a corresponding one of the axial ribs 88 via the bending portion 90, the pedal bracket 40 can be enhanced in strength and rigidity as described above. Because this effect is achieved, an effect of suppressing the oscillation of a steering wheel is achieved as well. Moreover, the aforementioned effect can also contribute toward enhancing rigidity of the vehicle as a whole.

Further, in the case of the first embodiment, since the axial ribs 88 are set, when the pedal bracket 40 is mounted, a dash insulator 24' on the rear face side of the dash panel 16 can be pressed over a wide range as shown in FIG. 6. Thus, the vehicle can be enhanced in NV (i.e. Noise and Vibration) performance.

Moreover, in the case of the first embodiment, since each of the peripheral ribs 86 is linked with a corresponding one of the axial ribs 88, a fastening point on the side of the coupling bracket 72 and a fastening point on the side of the brake booster 32 are linked together by one part. Accordingly, an enhancement in part precision and mounting precision can be achieved.

[second Embodiment]

Next, a vehicular pedal supporting structure in accordance with the second embodiment of the invention will be described with reference to FIGS. 9 and 10. It is to be noted herein that the same components or constituent elements as in the first embodiment are denoted by the same reference numerals respectively and will not be described again hereinafter.

Figure 9:
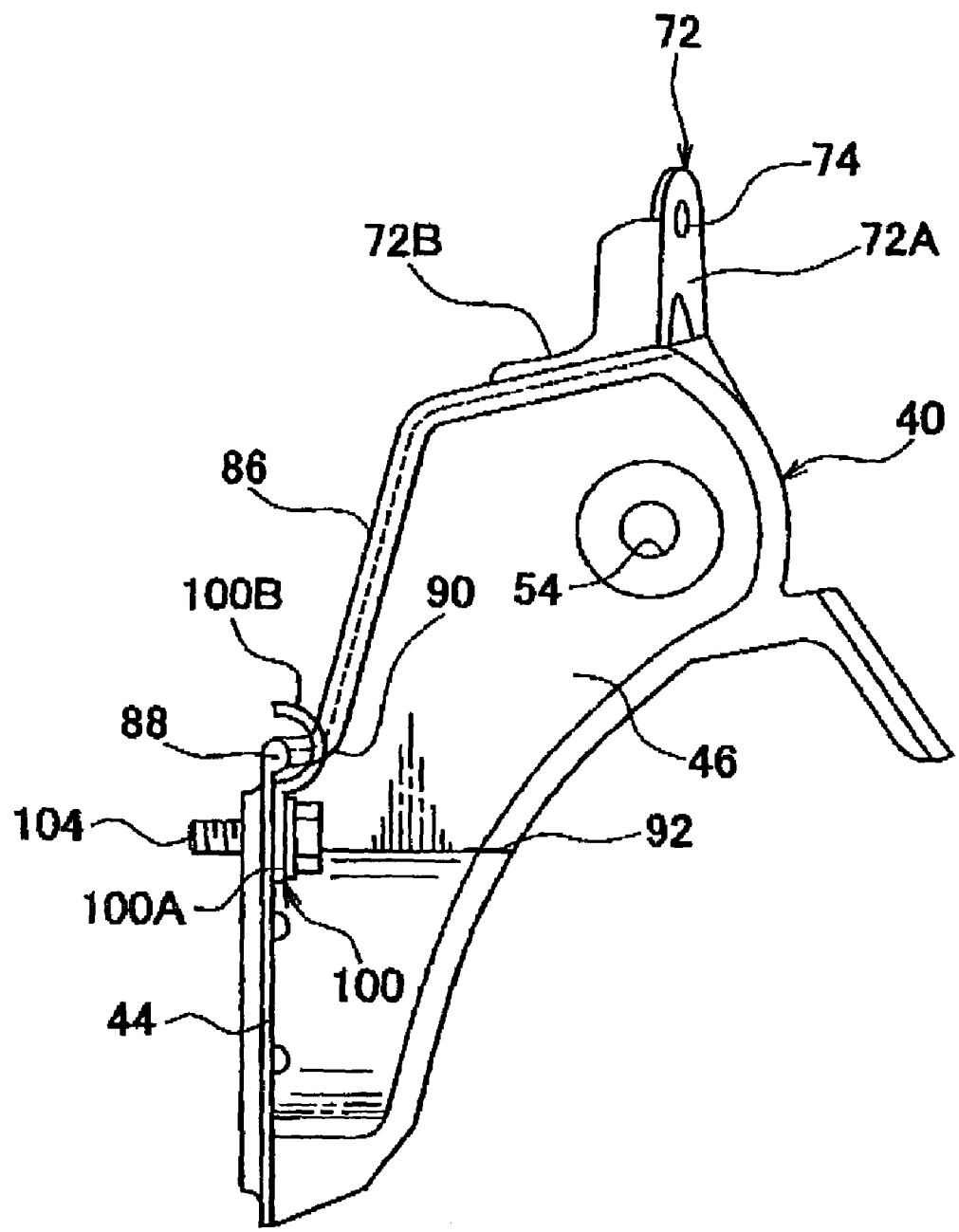
FIG. 9 is a perspective view of a pedal bracket employed in a vehicular pedal supporting structure in accordance with a second embodiment of the invention.
Figure 10:
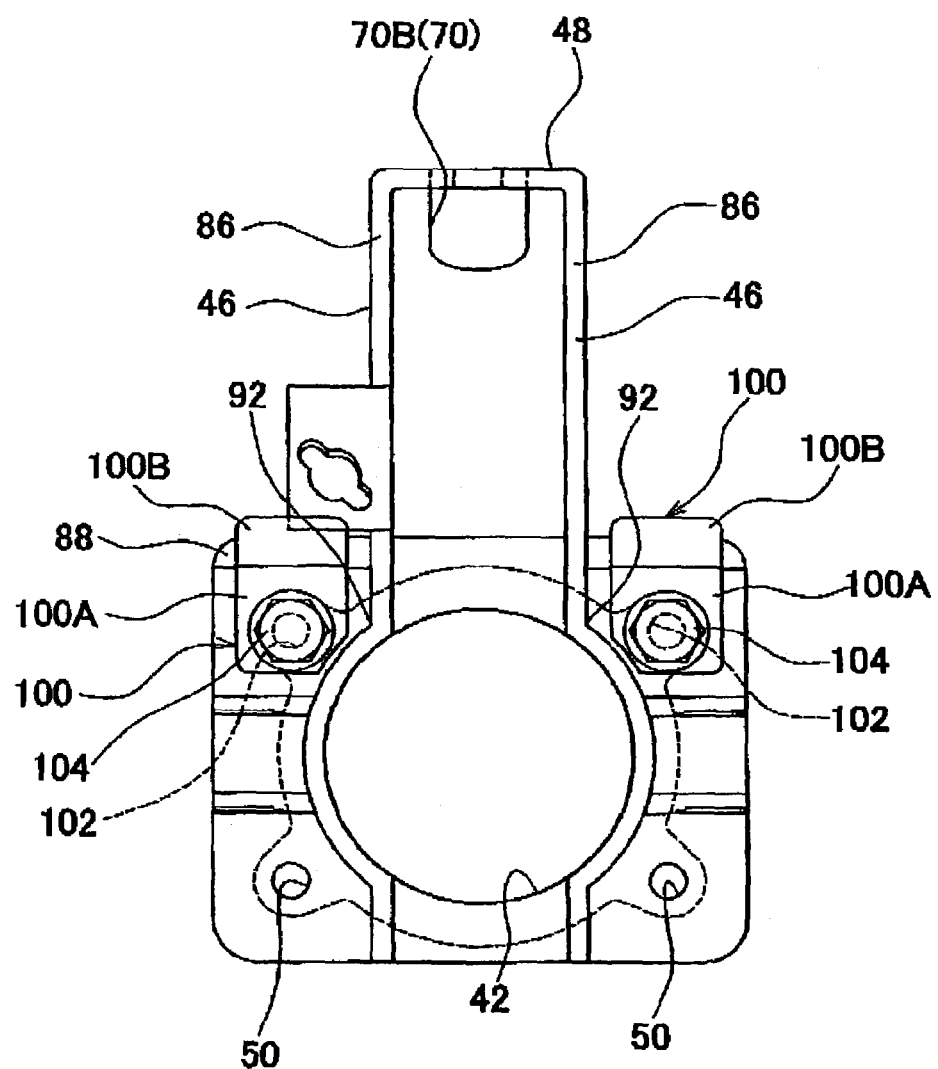
FIG. 10 is a rear view of the pedal bracket shown in FIG. 9.
Figure 12:
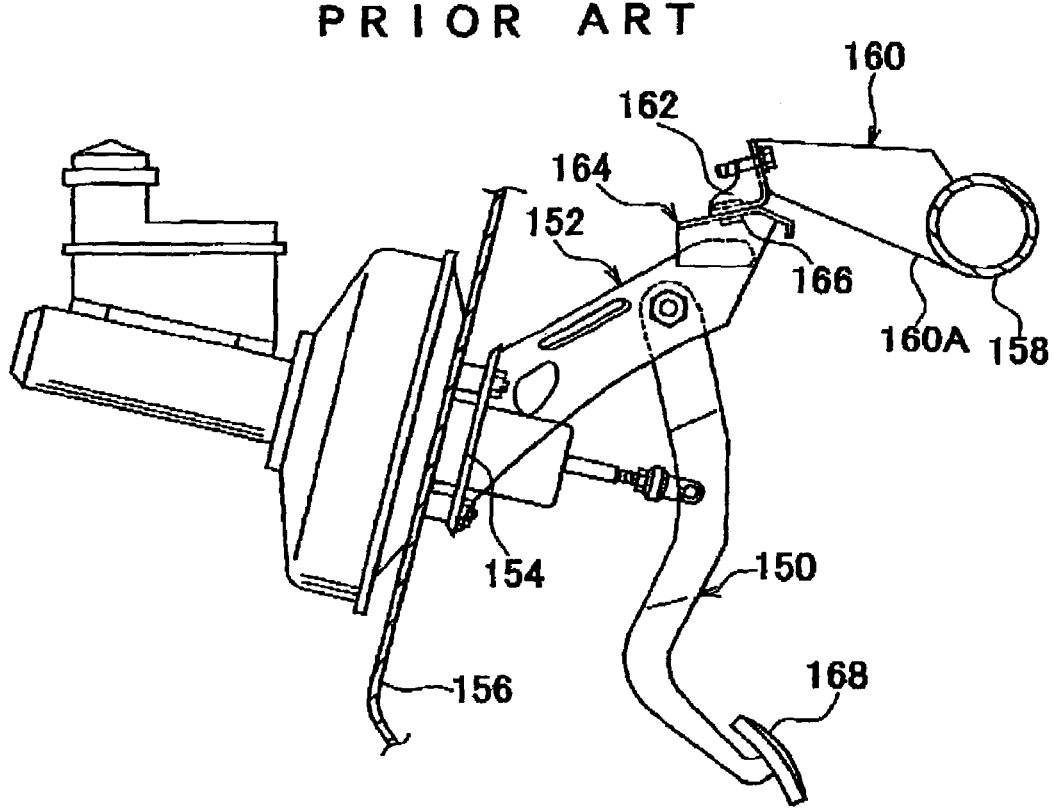
FIG. 12 is a side view of the overall arrangement of a vehicular pedal supporting structure in accordance with the related art.

As shown in FIGS. 9 and 10, the second embodiment is characterized in that a pair of brackets 100 constructed separately from the pedal bracket 40 are set on the upper edge side of the base portion 44 of the pedal bracket 40. In FIG. 9, the coupling bracket 72 as a part separate from the pedal bracket 40 is illustrated as well.

Each of the brackets 100 is composed of a base portion 100A and an engaging portion 100B. The base portion 100A is in the shape of a rectangular flat plate. The engaging portion 100B is in the shape of a circular arc face and is integrally extended from an upper edge of the base portion 100A. A bolt insertion hole 102 (see FIG. 10) is formed in the base portion 100A, so that common fastening can be carried out by a bolt 104 and a nut while utilizing a corresponding one of the bolt insertion holes 50 formed in the corner portions on the upper edge side of the base portion 44. If an actual mounting situation is taken into account, it is rational that a stud bolt protruding from the brake booster 32 be inserted into a region corresponding to the bolt 40 and that a nut be fastened from inside the cabin. The engaging portion 100B of each of the brackets 100 mentioned above assumes a semicircular shape in a side view, and is disposed behind a corresponding one of the axial ribs 88 mentioned above.

According to the aforementioned arrangement, when the pedal bracket 40 is ruptured, the axial ribs 88 serving as a rotational center remain on the side of the rear pedal bracket portion 96. However, each of the axial ribs 88 is engaged with the engaging portion 100B of a corresponding one of the brackets 100, whereby the rear pedal bracket portion 96 that has been ruptured is rotationally displaced around the axial ribs 88 that are in an engaged state. Thus, according to the second embodiment, the mode of rotational displacement of the rear pedal bracket portion 96 that has been ruptured can be further stabilized (controlled).

[Third Embodiment]

Next, a vehicular pedal supporting structure in accordance with the third embodiment of the invention will be described with reference to FIG. 11. It is to be noted herein that the same components or constituent elements as in the first or second embodiment are denoted by the same reference numerals respectively and will not be described again hereinafter.

As shown in FIG. 11, the third embodiment is characterized in that a pedal bracket 110 is not a cant piece but is constructed by combining some press-molded pieces. More specifically, the pedal bracket 110 is constructed by combining a base plate 112 in the shape of a rectangular flat plate, a pair of left and right side plates 114 and 116, and a top plate 118 for linking upper edges of the left and right side plates 114 and 116 together.

Front end portions 114A and 116A of the left and right side plates 114 and 116 are bended in such directions as to move away from each other, and are stuck to both lateral portions of the base plate 112. In addition, flanges 114B and 116B are formed on the upper edge side of the left and right side plates 114 and 116 respectively so as to guarantee a function as the peripheral ribs 86. Moreover, flanges 114C and 116C are formed in upper edges of the front end portions 114A and 116A of the left and right side plates 114 and 116 respectively so as to guarantee a function as the axial ribs 88. The flanges 114B and 114C are linked together, while the flanges 116B and 116C are linked together. Furthermore, the front end portions 114A and 116A of the left and right side plates 114 and 116 are so dimensioned as to be higher than the base plate 112 by a predetermined distance "h". In addition, the top plate 118 is bended like a hook in a rear view. A lateral portion 118A of the top plate 118 is stuck to an inner face of the left side plate 114, and an outer end of the top portion 118B is stuck to the flange 116B on the upper edge side of the right side plate 116.

The aforementioned arrangement also ensures that the pedal bracket 110 is rotationally displaced basically in the same mode as in the first embodiment At this moment, upper edge portions 114C and 116C (at the height "h") of the front end portions 114A and 116A of the left and right side plates 114 and 116 are more fragile than regions surrounding the upper edge portions 114C and 116C. Therefore, these portions stretch during rotational displacement of the pedal bracket 110, whereby rotational displacement thereof is smoothened.

[Supplementary Explanation of the Embodiments]

Although the invention is applied to a main brake pedal of suspension type in the aforementioned embodiments, the invention is not limited thereto. That is, the invention is also applicable to other vehicular pedals such as a clutch pedal of suspension type, a parking brake pedal of tread type, and the like.

Also, although the aforementioned embodiments adopt a construction in which the support bracket 28 is hung across the space between the dash panel 16 and the instrument panel reinforce 26, the invention is not limited thereto. It is also acceptable to adopt a construction in which the support bracket 28 is supported only on the side of the instrument panel reinforce 26 (in a cantilever manner).

Figure 13:
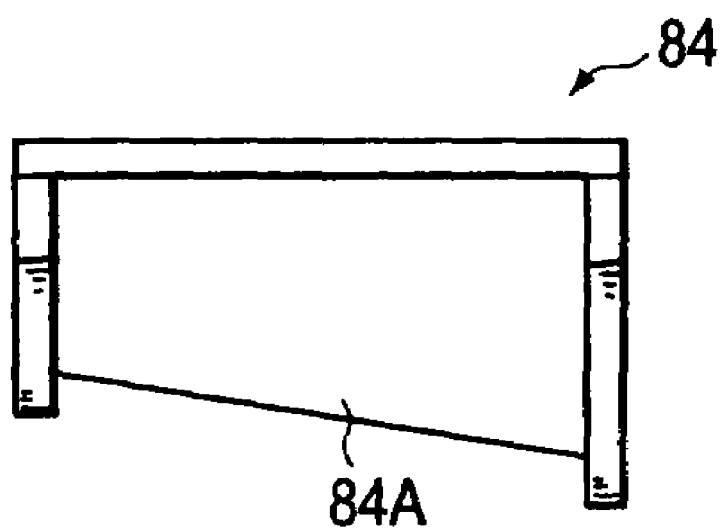
FIG. 13 is an exemplary front view of a slide guide in accordance with an alternative embodiment of the invention.

Furthermore, although the guide face 84A of the slide guide 84 is constructed axisymmetrically with respect to the lateral direction of the bracket in the aforementioned embodiments, the invention is not limited thereto. It is also appropriate that the rear portion of the pedal bracket 40 be guided backwards and downwards with respect to the vehicle and be asymmetrically formed by being inclined in the lateral direction of the vehicle. An example of this is illustrated in FIG. 13, which is a front view of a modified slide guide 84 with additional elements omitted for clarity. In this case, while the rear portion of the pedal bracket 40 is rotationally displaced along the guide face, a torsional force can be applied to the pedal bracket 40. In addition to a compressive force acting substantially in the longitudinal direction of the vehicle, therefore, a torsional force acting substantially in the lateral direction of the vehicle is applied to the lower edge side of each of the side portions 46 of the pedal bracket 40. As a result, the crack 94 is easily created in the lower edge of each of the side portions 46 of the pedal bracket 40. Accordingly, the crack 94 can be quickly created in each of the side portions 46 of the pedal bracket 40, and a load can be inhibited from being input to the side of the instrument panel reinforce 26 from an early stage, that is, as soon as a predetermined external force is applied from the front side of the vehicle. Consequently, the aforementioned arrangement can ensure, with a simpler construction, both that the pedal bracket 40 exhibits high strength and rigidity during normal pedal operation and that the load input to the instrument panel reinforce 26 is reduced during application of the external force.

Further, in the first and second embodiments described above, the pedal bracket 40 made of die-cast aluminum is employed. Instead of using a nonferrous metal such as die-cast aluminum as in this case, however, it is also possible to manufacture a pedal bracket from cast iron.

Furthermore, although the coupling bracket 72, the weld nut 80, the mounting bolt 82, the slit 70 of the pedal bracket 40 constitute elements that are regarded in a broad sense as separation means in the aforementioned embodiments, the separation means can be constructed in various manners. For example, it is also appropriate that the top portion of the pedal bracket and the coupling bracket be fastened together by a rivet without forming a slit, that a predetermined load or more be input to the rivet, and that the rivet be thereby sheared to separate the top portion of the pedal bracket from the coupling bracket. It in also appropriate to adopt a construction wherein spot welding is utilized in place of a rivet and wherein a welded portion is detached or sheared through application of a predetermined load or more.

Further, in the aforementioned embodiments, the slide guide 84 including the guide face 84A is provided so as to slide the rear portion of the pedal bracket 40. However, it is also possible to dispense with the slide guide 84 by utilizing the mounting portion 28B of the support bracket 28, to which the slide guide 84 is mounted, directly as a guide face.

Furthermore, in the aforementioned embodiments, the axial ribs 88 protrude outwardly of the side portions 46 of the pedal bracket 40 respectively. As shown in the model view of FIG. 8, however, the axial ribs 88 may be linked to constitute a single axial rib.

Further, in the aforementioned embodiments, each of the peripheral ribs 86 is formed along the entire circumference of a corresponding one of the side portions 46. However, it is not absolutely required that the peripheral ribs 86 be formed along the entire circumference. As shown in the model view of FIG. 8, sufficient functions can be performed as long as peripheral ribs are formed at least over a range extending from a point to which a load transmitted from the dash panel 16 is input to a coupling point to be coupled to the side of a second vehicle-body-side constituent member Moreover, although the bending portion 90 assumes the shape of "L" in a side view so as to control the direction in which the crack 94 proceeds in the aforementioned embodiments, the invention is not limited thereto. A bending portion in the shape of "V" or the like may also be employed instead. Still further, if calculated control of the direction in which the crack 94 proceeds is not required, the peripheral ribs 86 and the axial ribs 88 may be linked together respectively without being offset to the lower edge side.

Further, although the path to be followed by the crack 94 is controlled such that the axial ribs 88 are laid on the rear pedal bracket portion 96 after the pedal bracket 40 has been ruptured in the aforementioned embodiments, the invention is not limited thereto. The pedal bracket 40 may also be ruptured such that the axial ribs 88 are laid on the front pedal bracket portion 98. Namely, the invention set forth in claim 1 includes not only the former crack (rupture) but also the latter crack (rupture). The manner in which the former crack (rupture) is created brings about greater merit, for example, in that the posture of the rear pedal bracket portion 96 is stabilized during rotational displacement after the pedal bracket 40 has been ruptured. However, even if the pedal bracket 40 is designed such that the side portions 46 are longitudinally split, it is certain that the pedal bracket 40 is ruptured, and an effect of reducing the load input to the side of the instrument panel reinforce 26 is achieved.

As described hitherto, according to the vehicular pedal supporting structure of the invention, the pedal bracket for swingably supporting the pedal of suspension type is provided with the rupture creation means for ensuring that the rear pedal bracket portion is at least partially ruptured from the front pedal bracket portion during rotational displacement of the rear pedal bracket portion. Therefore, when the pedal bracket is displaced backwards with respect to the vehicle together with a vehicle-body-side constituent member as a result of application of a predetermined external force from the front side of the vehicle, excellent effects are produced. That is, the trodden face of the pedal can be displaced substantially forwards with respect to the vehicle, and besides, the load input to the side of the instrument panel reinforce can be reduced.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments, are shown in various combinations and configurations, which are exemplary, other combinations and configurations, including more, less or only a single element, are also within the spirit and scope of the invention.

What is claimed is:

1. A vehicular pedal supporting structure comprising:
   a pedal bracket having a front portion fixed to a first vehicle-body-side constituent member disposed on a front side of a vehicle, a rear portion extended toward a rear side of the vehicle, and two lateral side portions;
   a suspended pedal that is supported on both lateral side portions of the pedal bracket so as to be swingable around a center shaft, the pedal including a trodden face to which a treading force of a passenger is applied; and
   a guide provided in a second vehicle-body-side constituent member disposed behind the first vehicle-body-side constituent member with respect to the vehicle, the guide causing the rear portion of the pedal bracket on which the pedal is supported to be displaced backwards and downwards with respect to the vehicle when the pedal bracket is displaced backwards with respect to the vehicle together with the first vehicle-body-side constituent member as a result of application of an external force from the front side of the vehicle to create a rotational displacement of the rear portion of the pedal bracket relative to the front portion of the pedal bracket,
   wherein the pedal bracket is provided with a rupture creation mechanism that ensures that the rear portion of the pedal bracket is at least partially ruptured from the front portion thereof by creating a crack in the pedal bracket due to the rotational displacement.

2. The vehicular pedal supporting structure according to claim 1, wherein the pedal bracket has a rotational support portion that serves as a rotational center for the rotational displacement of the rear portion of the pedal bracket, and
   the rotational support portion is located in the vicinity of an upper edge of the front portion fixed to the first vehicle-body-side constituent member.

3. The vehicular pedal supporting structure according to claim 2, wherein the rotational support portion extends laterally from both lateral side portions of the pedal bracket.

4. The vehicular pedal supporting structure according to claim 2, wherein a first thick-wall portion is provided in each of the lateral side portions of the pedal bracket along a peripheral edge thereof.

5. The vehicular pedal supporting structure according to claim 4, wherein the rotational support portion is a second thick-wall portion and is linked with the first thick-wall portion in the vicinity of the upper edge of the front portion of the pedal bracket.

6. The vehicular pedal supporting structure according to claim 5, wherein the rupture creation mechanism at least partially creates a rupture toward the rotational support portion, with a lower edge of each of the lateral side portions of the pedal bracket being a starting point.

7. The vehicular pedal supporting structure according to claim 6, wherein the first thick-wall portion and the second thick-wall portion are connected to each other at a position offset toward the lower edge side of each of the lateral portions of the pedal bracket.

8. The vehicular pedal supporting structure according to claim 1, wherein both the lateral side portions of the pedal bracket have a predefined shape in the front portion and in the rear portion that concentrates stress forces on the rupture creation mechanism.

9. The vehicular pedal supporting structure according to claim 1, wherein the guide is asymmetrically formed so as to guide the rear portion of the pedal bracket backwards and downwards with respect to the vehicle and to incline the rear portion of the pedal bracket in the lateral direction of the vehicle.

10. The vehicular pedal supporting structure according to claim 1, wherein the pedal includes a pedal arm that links the center shaft and the trodden face together,
    a longitudinally intermediate portion of the pedal arm and a treading force transmission member protruding from hydraulic pressure conversion means disposed in front of the first vehicle-body-side constituent member with respect to the vehicle are relatively rotatably coupled to each other by a support shaft, and
    the pedal is coupled to and supported by only the treading force transmission member once the rear portion of the pedal bracket is ruptured from the front portion thereof.

11. The vehicular pedal supporting structure according to claim 1, wherein the pedal bracket is constructed as an integrally cast piece.

12. The vehicular pedal supporting structure according to claim 1, wherein the pedal bracket is made of an aluminum material.

* * * * *